United States Patent [19]

Reynolds

[11] Patent Number: 4,706,403
[45] Date of Patent: Nov. 17, 1987

[54] FISHING BAIT APPLICATOR

[76] Inventor: John L. Reynolds, 5200 Irvine Blvd., Space 84, Irvine, Calif. 92714

[21] Appl. No.: 940,978

[22] Filed: Dec. 12, 1986

[51] Int. Cl.$^4$ ............................................. A01K 97/00
[52] U.S. Cl. ........................................................ 43/4
[58] Field of Search ........................ 43/4; 223/99, 104

[56] References Cited

U.S. PATENT DOCUMENTS

| 912,915 | 2/1909 | Stockland | 223/99 |
| 3,050,896 | 9/1962 | Parker | 223/104 |
| 3,925,919 | 12/1975 | Huth | 43/4 |
| 4,073,083 | 2/1978 | Davis | 43/4 |
| 4,559,734 | 12/1985 | Sauer et al. | 43/4 |
| 4,641,652 | 2/1987 | Hutterer et al. | 223/99 |

FOREIGN PATENT DOCUMENTS 269478 10/1945 France .................................. 223/99

Primary Examiner—Nicholas P. Godici
Assistant Examiner—Karen Skillman
Attorney, Agent, or Firm—Plante Strauss Vanderburgh

[57] ABSTRACT

This invention comprises a tool for baiting of fishing hooks and lines. The tool has a handle with a pair of telescoping needles; the first needle is hollow and slidably receives the second needle. Both of the needles have end recesses for receiving the point of a fishing hook. The first, outer needle also has a distal notch for attachment of a leader or fishing line while the second, inner needle has a distal aperture through which a leader or fishing line can be threaded.

The handle slidably receives the inner needle and has detents to lock the inner needle in its extended and retracted positions. The inner needle is used for application of bait to small hooks or to a leader, while the outer, larger diameter needle is used for the application of bait to large hooks or to leaders. Both needles can be used to apply bait to multiple-hook fishing hooks.

12 Claims, 7 Drawing Figures

FISHING BAIT APPLICATOR

BACKGROUND OF THE INVENTION

1. Field of Invention

This invention relates to a tool for the application of artificial and natural bait to fishing hooks and, in particular, to a device that provides a simpler and more reliable method for baiting a fishing line.

2. Brief Statement of the Prior Art

Fishing bait applicators of various designs and configurations have been disclosed by a number of prior investigators.

U.S. Pat. No. 4,559,734 discloses a needle having a hook end for attachment of a leader, thereby premitting threading of the leader through the bait. This device has no provision to secure a hook and the user must pull the leader loop and knot through the bait, a practice which is destructive of small bait such as fishing worms.

U.S. Pat. No. 4,073,083 discloss a fishing bait applicator having a single, hollow needle permanently secured to a handle. This structure permits the application of bait only to single hooks with no accommodation for varied sizes of bait.

U.S. Pat. No. 3,925,919 also discloses a needle for threading bait on fishing hooks and leaders. This structure has a single, solid needle permanently secured to a handle. The solid needle has one or more notches which receive a fishing hook. The application of bait to the hook with this application requires that the bite of the hook be forced through the bait. If used with small bait, this device would destroy the bait.

U.S. Pat. No. 2,948,979 discloses a single, solid needle having an end recess to receive the pointed end of a fish hook. The bait is threaded over this single solid needle and then is pushed off the needle onto the hook. This device cannot be used for multiple fish hooks, or for threading leaders through bait and has no capability to handle varied sizes of bait.

BRIEF SUMMARY OF THE INVENTION

This invention comprises a tool for baiting of fishing hooks and lines. The tool has a handle with a pair of telescoping needles; the first needle is hollow and slidably receives the second needle. Both of the needles have end recesses for receiving the point of a fishing hook. The first, outer needle also has a distal notch for attachment of a leader or fishing line while the second, inner needle has a distal aperture through which a leader or fishing line can be threaded.

The handle slidably receives the inner needle and has detents to lock the inner needle in its extended and retracted positions. The inner needle is used for application of bait to small hooks or to a leader, while the outer, larger diameter needle is used for the application of bait to large hooks or to leaders. Both needles can be used to apply bait to multiple-hook fishing hooks.

BRIEF DESCRIPTION OF THE DRAWINGS

The invention will be described with reference to the FIGURES, of which.

DESCRIPTION OF PREFERRED EMBODIMENTS

Figure 1:
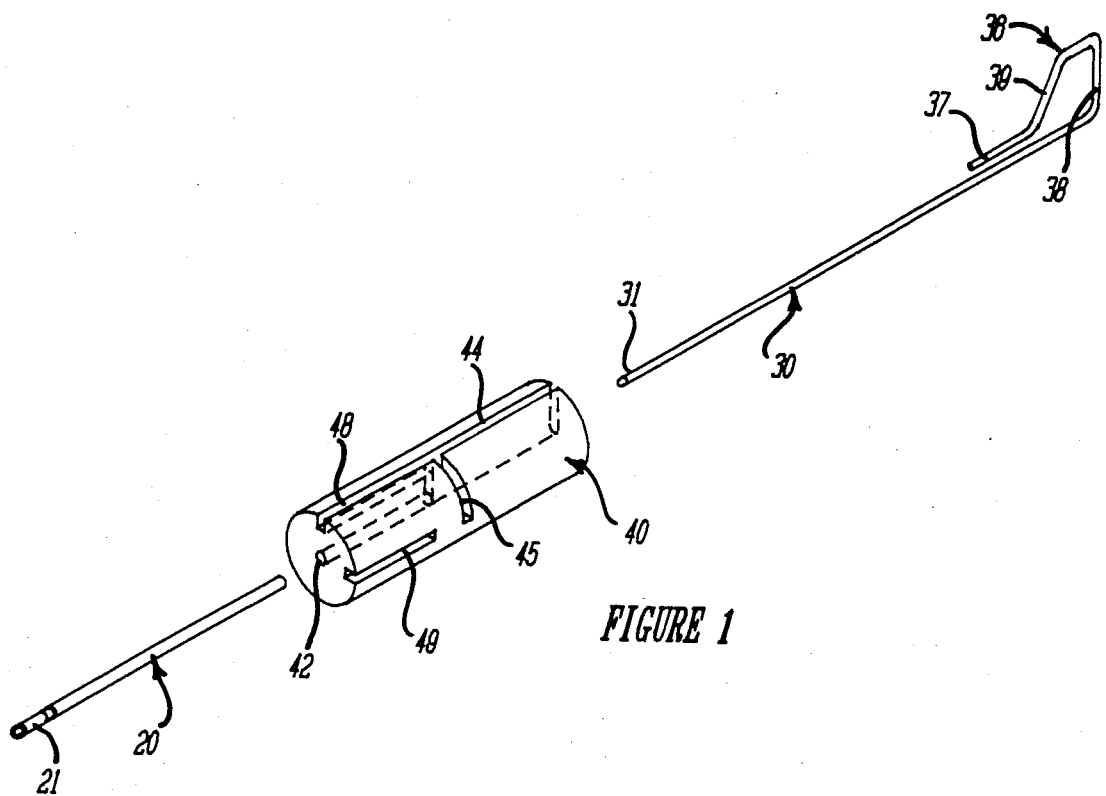
FIG. 1 is an exploded perspective view of the fishing bait applicator.

Referring now to FIG. 1, the fishing bait applicator of the invention is illustrated in exploded perspective view. As there illustrated, the fishing bait applicator comprises three major parts, a first, large diameter hollow needle 20, a telescoping, small diameter inner needle 30 and a handle 40.

The outer needle 20 is hollow and is received within handle 40, preferably extending to approximately the middle of the handle. The inner needle 30 telescopes within outer needle 20 and, for this purpose, is of smaller diameter and is preferably solid form. Needles 20 and 30 have pointed ends 21 and 31, respectively. At its end opposite the pointed end 31, needle 30 has a crook 36 with a radial arm 38, return 39 and a forward extending prong 37.

Handle 40 has a central, longitudinal, through bore 42 coextensive its length. The handle also has a longitudinal deep slot 44 that intersects the through bore 42 and extends to an intermediate position, approximately to the middle, of handle 40. Slot 44 terminates in a sector slot 45 which intersects slot 44 and through bore 42. A first, longitudinal and shallow slot 48 is provided in the forward end of handle 40, aligned with and extending from the deep slot 44. A second longitudinal and shallow slot 49, of the same depth as the first shallow slot 48, is also provided in the forward end of handle 40. Short slot 49 extends a slight distance, approximately one-fourth the length of handle 40.

Figure 2:
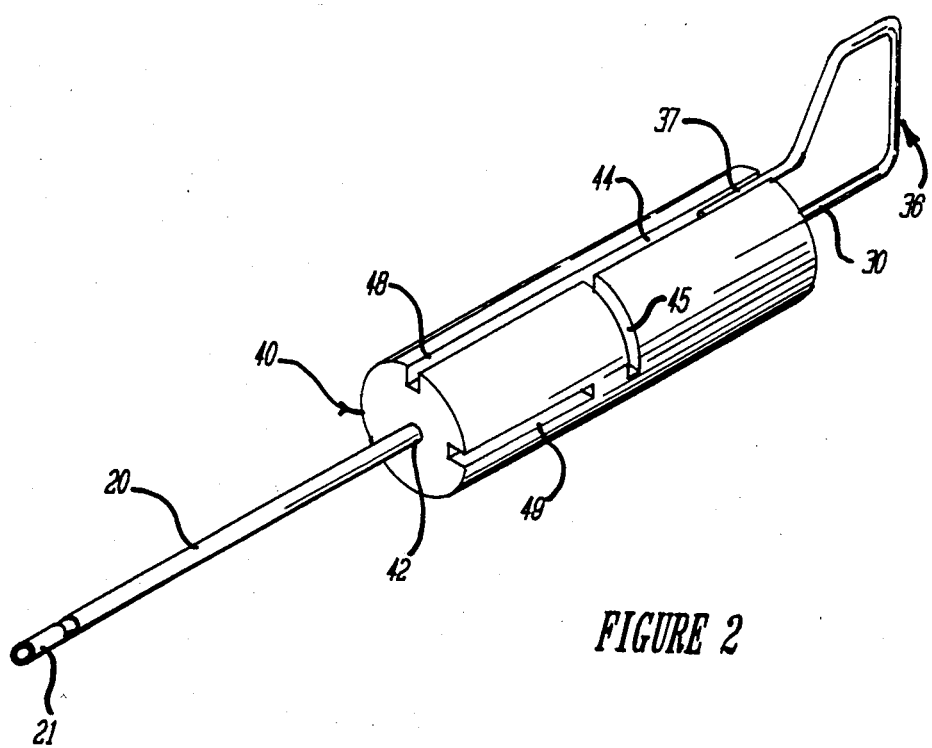
FIG. 2 illustrates the assembled fishing bait applicator with the inner needle in its retracted position.

Referring now to FIG. 2 the fishing bait applicator is illustrated in its assembled condition with the inner needle 30 retracted. In this configuration, the outer needle 20 is stationary and permanently secured in the longitudinal through bore 42 of handle 40. For this purpose, outer needle 20 can be press fitted in through bore 42, and/or secured therein with a suitable cement. The inner needle is illustrated in its retracted position, with crook 36 received outside of and to the rear of handle 40. If desired, a small diameter bore (not shown) can be placed in the rear end of handle 40 to receive the forward end of prong 37 of crook 36. In the illustration, however, the prong 37 is placed in slot 44, in a ready condition to extend the needle.

Figure 3:
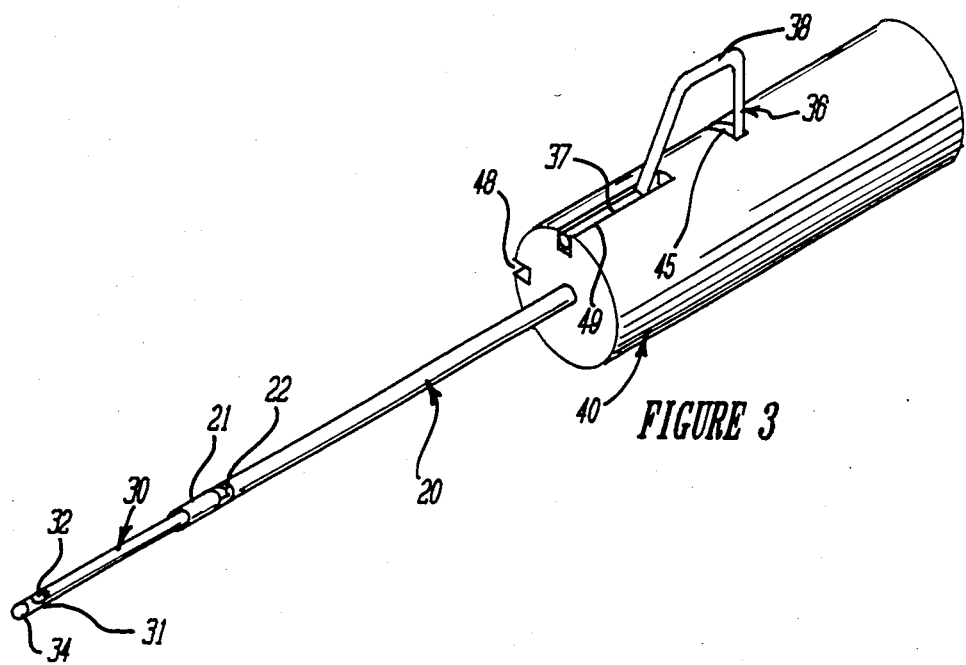
FIG. 3 illustrates the assembled fishing bait applicator with the inner needle in its extended position.

Referring now to FIG. 3, the fishing bait applicator is illustrated in the configuration with the inner needle 30 in its extended position, projecting forwardly of the pointed end 21 of stationary needle 20. Crook 36 is received within handle 40, fully advanced in longitudinal deep slot 44 and rotated to swing its radial arm 38 through the sector slot 45. The forward prong 37 is thereby moved from the first shallow slot 48 into the second, short shallow slot 49. In this position, the inner needle 30 is locked or detented into a stable configuration with its pointed end 31 fully extended beyond the pointed end 21 of the outer needle 20.

The large diameter, hollow needle 20 has a pointed or beveled end 21 and a distal notch 22 which is preferably angled wth the same incline as the end bevel of this needle. The small diameter needle 30 also has a pointed, or beveled, end 31, a small diameter aperture 32, and an end recess 34.

Figure 4:
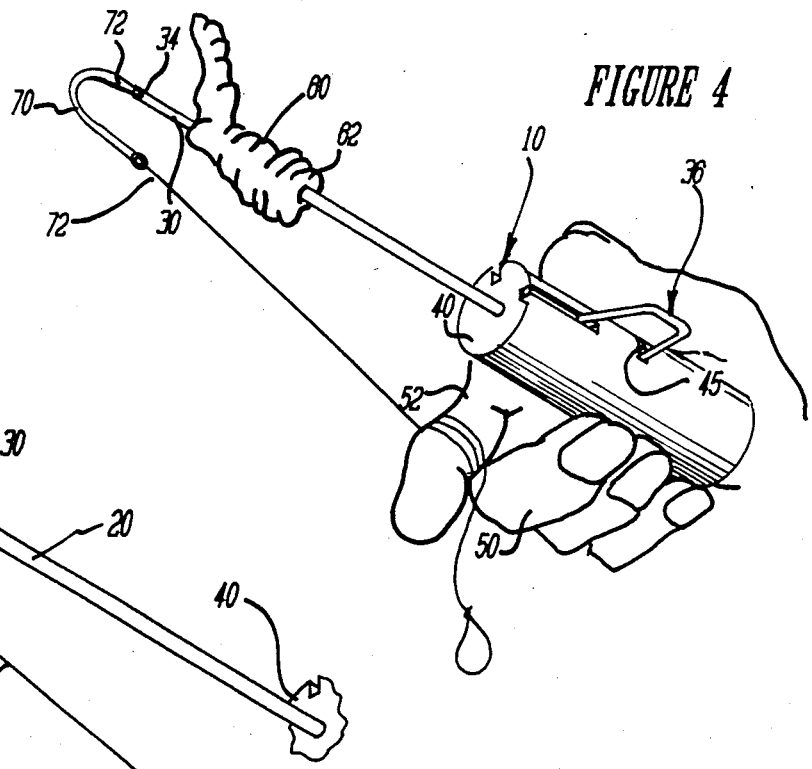
FIGS. 4 and 5 illustrate the method of baiting small fishing hooks.
Figure 5:
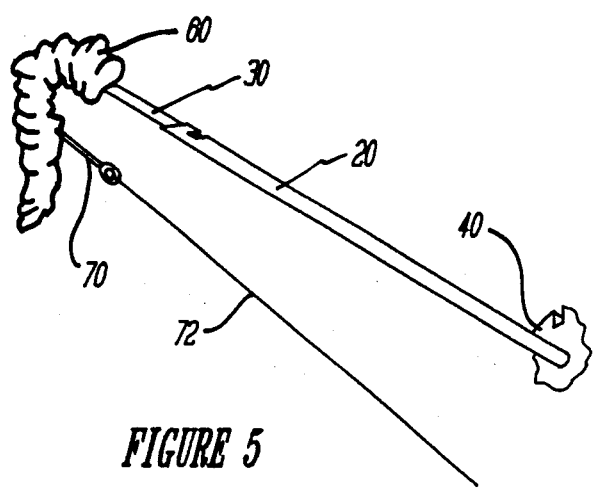

Referring now to FIGS. 4 and 5, the method of installing small bait on single fishing hooks is illustrated. In the illustrated embodiment, the fishing bait applicator 10 is employed with its small diameter needle 30 fully extended and the crook 36 of the needle locked in sector slot 45. This is the configuration shown in FIG. 3. In this configuration, the handle 40 is grasped in the palm of the user's hand 50 and the fishing bait, e.g., fishing worm 60, is threaded over the telescoping needles, with the small diameter needle 30 entering the forward end 62 of bait 60. The bait 60 is pushed onto the needle a sufficient distance and the inner needle is permitted to exit the bait at a proper location. After threading the bait on the applicator, the user places a small fishing hook 70 with its barbed end 71 in the small diameter end recess 34 of inner needle 30. The needle is retained in this position by applying tension on the leader 72 which can be looped about the user's index finger 52.

The next step is to move the bait 60 off the applicator and onto the hook and leader. This is illustrated in FIG. 5. As the bait 60 is slid off the small diameter needle 30, it is threaded onto the hook 70 and leader 72. Once the bait is positioned over the hook 70, the hook is completely baited and is removed.

Figure 6:
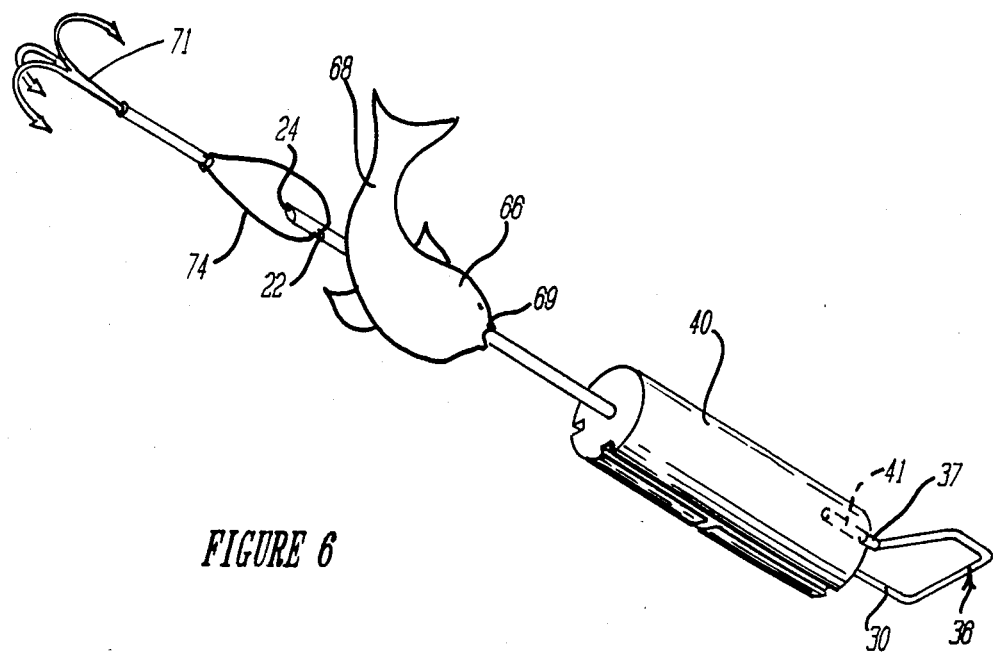
FIG. 6 illustrates the method of baiting large hooks.

Referring now to FIG. 6, the invention is illustrated as it can be used to apply large bait to single or multiple hooks. In the illustrated embodiment, the small diameter needle 30 is retracted to the configuration shown in FIG. 2. This places the crook 36 outside of handle 40 with the prong 37 seated in the small diameter end bore 41 of handle 40. The bait, such as a small minnow 66, is threaded over the bevelled end 21 of the large diameter needle 20 which enters the mouth 69 of the minnow 66. When the needle 20 has penetrated sufficiently through the minnow 66 it can be exited, e.g., just beneath the tail 68 of minnow 66. The loop 74 of a leader is then placed into the notch 22 of needle 20. The loop and leader can then be pulled through the minnow 66, exiting from its mouth 69, firmly setting the hooks 71 at the appropriate distance from the body of the minnow.

Figure 7:
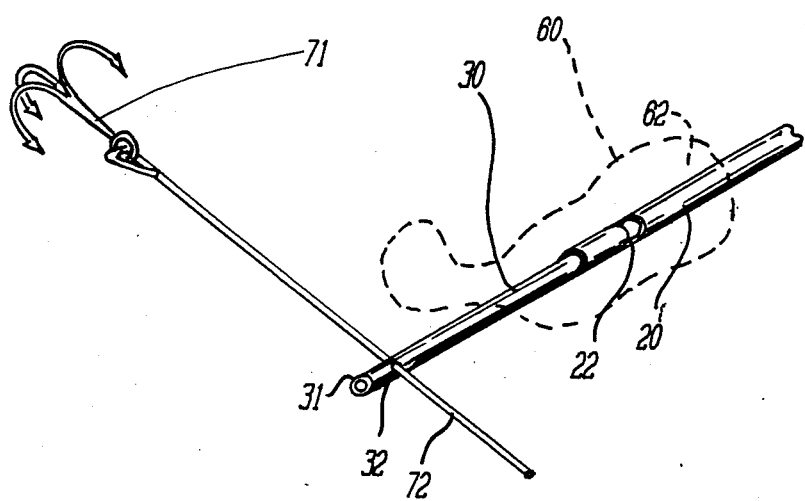
FIG. 7 illustrates the method of baiting multiple fishing hooks.

Referring now to FIG. 7, the invention is illustrated as used to apply multiple hooks 71 to small bait. In this application, the small diameter needle 30 is extended to the configuration shown in FIG. 3. The bait 60 (shown in phantom lines) is threaded over the telescoping needles, with the pointed end 31 of small diameter needle 30 entering the forward end 62 of the bait and exiting at an appropriate distance along the length of the bait. The bait is thus impaled on the telescoping needles and the leader 72 is inserted through the small diameter aperture 32 of needle 30. The bait can then be pushed off the telescoping needles and onto the leader 72, extracting the end of the leader from the forward end 62 of bait 60. This leader can then be attached to a fishing line in the customary manner.

The invention as thus illustrated is highly versatile, and can be used to apply artificial or live, natural bait to fishing leaders and hooks. It can be used to apply small and large bait to small and large hooks as well as to single and multiple fish hooks. The invention provides a number of benefits. It substantially reduces the loss of bait and ensures that each application of bait is done in a uniform manner which achieves maximum security of the bait. Its use permits the user to control, very precisely, the length of the bait which is applied over the leader or hook and to precisely locate the exact position of the hook relative to the bait. This results in increased hookups and catches with the bait and much fewer instances of lost bait.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A fishing bait threader comprising:
   a. a handle; and
   b. an awl dependent from said handle and comprising:
   (1) a first large diameter needle with a pointed end;
   (2) a second small diameter needle with a pointed end and telescoping received within said first large diameter needle;
   (3) first and second fishing hook receptacles distally carried on said first and second needles, respectively; and
   (4) first and second leader attachment means also distally carried on said first and second needles, respectively.

2. The fishing bait threader of claim 1 including detent means carried on said handle to lock said small diameter needle at an extended position, projecting forwardly of said large diameter hollow needle.

3. The fishing bait threader of claim 1 including detent means carried on said handle to lock said small diameter needle at a retracted position with its pointed end entirely received within said large diameter hollow needle.

4. The fishing bait threader of claim 1 wherein said leader attachment means include a notch in the pointed end of said large diameter needle.

5. The fishing bait threader of claim 1 wherein said leader attachment means include an aperture in the pointed end of said small diameter needle.

6. A tool to install bait on fishing hooks comprising:
   c. handle with coextensive through bore;
   d. a first hollow and pointed needle fixedly carried on said handle;
   e. a second handle pointed needle telescoping received in said first needle;
   f. a recess in the pointed end of said second needle;
   g. a distal aperture in said second needle; and
   h. a distal notch in the sidewall of said first needle.

7. The fishing tool of claim 6 including detent means carried on said handle to lock said small diameter needle at an extended position, projecting forwardly of said large diameter hollow needle.

8. The fishing tool of claim 6 including detent means carried on said handle to lock said small diameter needle at a retracted position with its pointed end entirely received within said large diameter hollow needle.

9. The fishing tool of claim 7 wherein said small diameter needle has a crook in its end opposite said pointed end and said handle has a longitudinal slot in its outer sidewall to receive said crook and rotationally restrain said second needle.

10. The fishing tool of claim 9 including a sector slot in said handle, intersecting said through bore and said longitudinal slot to receive and to axially restrain said crook.

11. The fishing tool of claim 10 including a short slot in the forward end of said handle to receive the forward end of said crook, thereby locking said second needle in its extended position.

12. A tool to install fishing hooks comprising:
a. a handle with a concentric through bore;
b. a first hollow needle with pointed end permanently secured to said handle, concentric with said through bore;
c. a second needle with a pointed end telescopingly received in said first needle;
d. a distal aperture in said second needle;
e. a distal notch in the sidewall of said first needle;
f. a radial arm distally carried at the rear of said second needle;
g. a prong forwardly extending from said radial arm;
h. a longitudinal slot in the outer sidewall of said handle receiving said radial arm to rotationally restrain said second needle;
i. a sector slot in said handle, intersecting said through bore and said longitudinal slot to receive and to axially restrain said radial arm; and
j. a short slot in the forward end of said handle to receive said prong, thereby locking said second needle in its extended position.

* * * * *

UNITED STATES PATENT AND TRADEMARK OFFICE
CERTIFICATE OF CORRECTION

PATENT NO. : 4,706,403
DATED : November 17, 1987
INVENTOR(S) : John L. Reynolds

It is certified that error appears in the above—identified patent and that said Letters Patent is hereby corrected as shown below:

In the Claims, Column 4:

Claim 6, line 45, delete the word "handle".

Signed and Sealed this

Fifth Day of April, 1988

Attest:

DONALD J. QUIGG

Attesting Officer

Commissioner of Patents and Trademarks